United States Patent

Bishop et al.

[11] 4,024,037
[45] May 17, 1977

[54] OXIDATION OF CYANIDES

[75] Inventors: Edmund Bishop, Exeter; David Timothy Wright, Edgware, both of England

[73] Assignee: National Research Development Corporation, London, England

[22] Filed: Feb. 10, 1976

[21] Appl. No.: 656,868

[30] Foreign Application Priority Data

Feb. 18, 1975  United Kingdom ............. 06801/75

[52] U.S. Cl. ................................ 204/149; 204/130
[51] Int. Cl.² ...................... C02B 1/82; C02C 5/12
[58] Field of Search .......... 204/149, 130, 131, 152, 204/49, 91

[56] References Cited

UNITED STATES PATENTS

| 1,818,229 | 8/1931 | Lutz et al. | 204/49 |
| 3,616,356 | 10/1971 | Roy | 204/152 |
| 3,645,867 | 2/1972 | Ericson et al. | 204/130 |
| 3,919,062 | 11/1975 | Lundquist, Jr. et al. | 204/152 X |

FOREIGN PATENTS OR APPLICATIONS 894,190  4/1962  United Kingdom ................. 204/49

OTHER PUBLICATIONS

Watts, "The Electrodeposition of Cobalt and Nickel", American Electrochemical Society Publication, (1913).

Primary Examiner—Arthur C. Prescott
Attorney, Agent, or Firm—Finnegan, Henderson, Farabow & Garrett

[57] ABSTRACT

The efficiency of electrochemical oxidation of cyanides is substantially improved by the presence of nickel ions. For example the addition of $10^{-3}$ molar nickel sulphate can triple the efficiency of the process. Nickel cyanide precipitates at the end of the reaction and is recovered and recycled.

9 Claims, 2 Drawing Figures

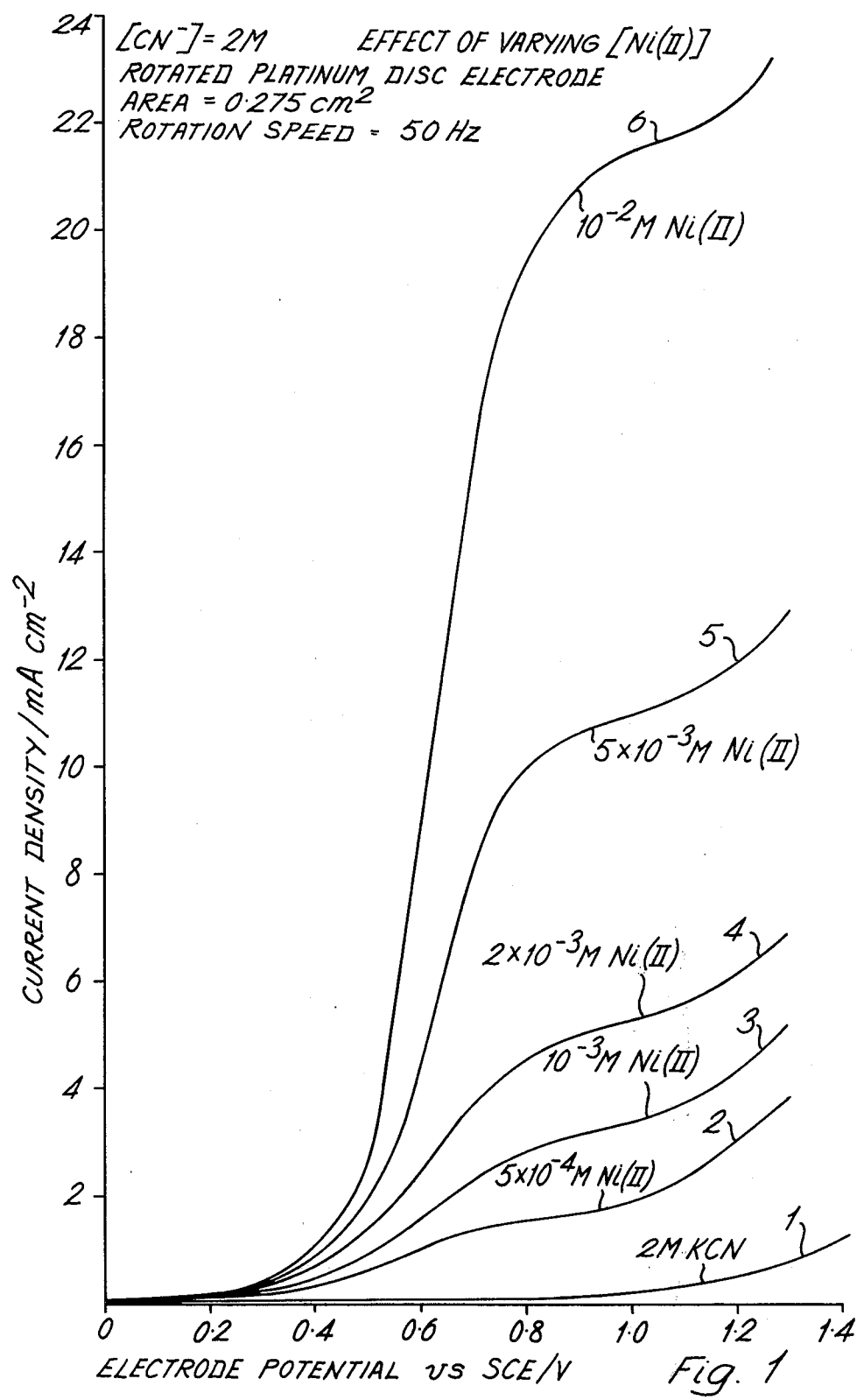

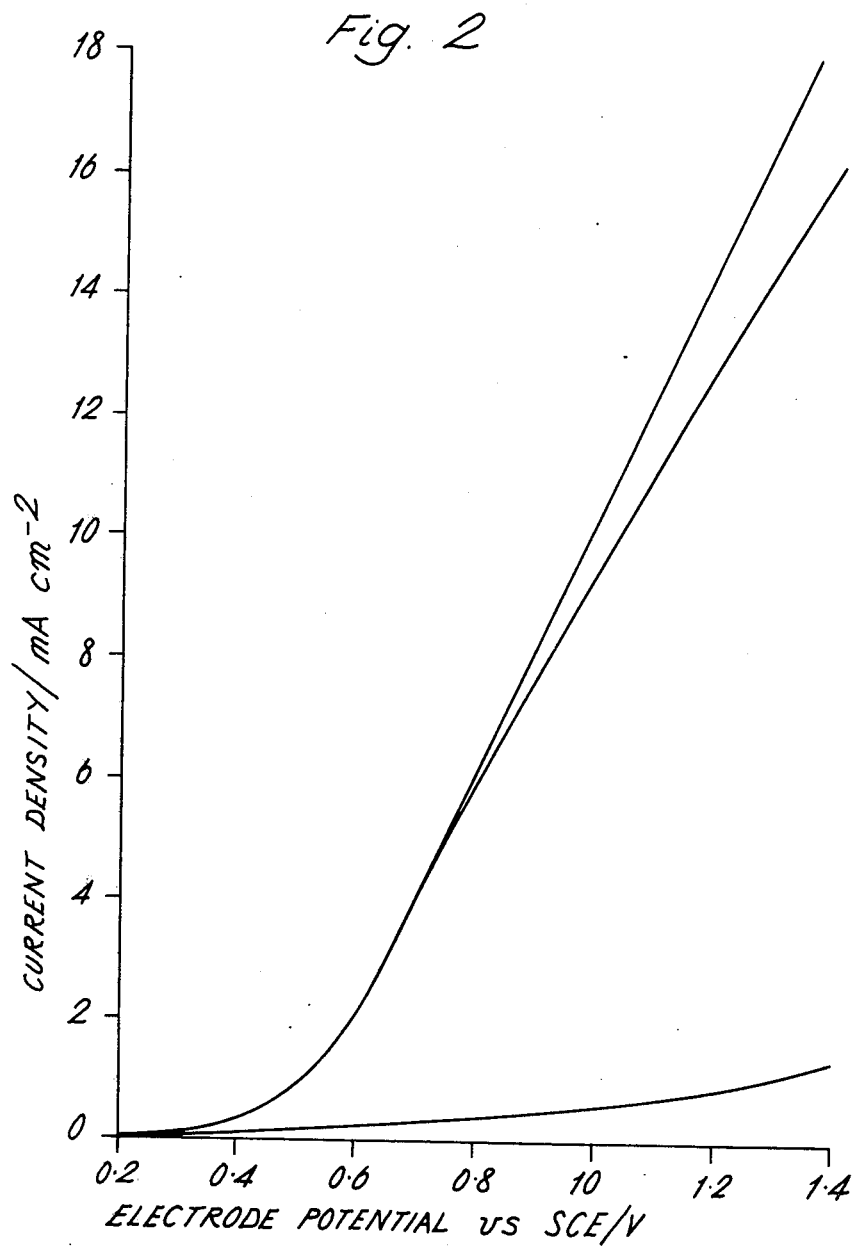

OXIDATION OF CYANIDES

This invention relates to the oxidation of cyanides and more particularly to the electrochemical oxidation of cyanide ions and complexes in, or brought into, aqueous solution. It has particular though not exclusive reference to the removal of cyanides in effluents and the like in connection with many industrial processes, e.g. the production of nitriles, nitrile polymers, certain fine and heavy chemicals, and in electroplating and metal hardening operations. It is applicable to the treatment of liquid wastes and solid wastes.

Existing electrochemical methods of cyanide destruction are unsatisfactory in many respects. Such methods depend on high rates of mass transfer, high temperatures, and large current densities for appreciable efficiency. This is because the electrochemical oxidation of $CN^-$ is a very slow process. The reaction is thought to be:

1. $2 CN^- \rightleftharpoons 2 CN\cdot + 2e^-$
2. $2 CN\cdot = (CN)_2$
3. $(CN)_2 \rightarrow$ hydrolysis products (cyanate and carbonate)

The slow electrode reaction means that at large current densities the electrode potential is such that the oxidation of the solvent ($H_2O$ and $OH^-$) takes place with the resultant liberation of oxygen.

To achieve the high rates of mass transfer required, fluidised bed electrodes have been proposed, either carbon granules or platinum plated glass spheres.

Other electrochemical methods in use involve the separate electrogeneration of chlorine, which is pumped into the cyanide to form cyanogen chloride, which then hydrolyses. Alternatively, chloride may be added to the cyanide liquor and chlorine electrogenerated in situ. In either case hold-up tanks are required to permit hydrolysis of cyanogen chloride and cyanate to reach completion before discharge to waste.

It has now been found that a dramatic increase in the rate of oxidation of cyanide ions is obtained in the presence of nickel ions.

Accordingly, the present invention comprises a process for the electrochemical oxidation of cyanide ions or complexes in which the electrolyte contains nickel.

Nickel may be introduced into the solution in the form of a salt, complex, or any other compound which is soluble in the cyanide bath. Conveniently nickel sulphate or any other soluble salt of Ni(II) may be used, or the solid end-product nickel cyanide may be recycled.

Experimental evidence clearly indicates that the process is catalytic, the nickel species catalysing the reaction being perhaps a complex ion, e.g. $Ni(CN)_4^{2-}$ or $Ni(CN)_5^{3-}$.

The mechanism of this unexpected catalytic reaction is not completely proven. At high cyanide concentration the oxidation of cyanide is quantitative with nickel concentrations between $10^{-3}$ and $10^{-2}$ mol $dm^{-3}$.

It is probable that the fifty cyanide in the $Ni(CN)_5^{3-}$ anion which forms at high cyanide concentrations plays a role. At lower cyanide concentration, electrolysis results in the deposition of green nickel cyanide $Ni(CN)_2$ and a fall in the cyanide concentration to below 1 ppm. This is due to the direct electrode reaction of the complex to give:

$Ni(CN)_4^{2-} = Ni(CN)_2 + 2 CN\cdot + 2e^-$

The increase in oxidation rate caused by the presence of nickel is believed to be enhanced by the prevention of the second reaction in the reaction scheme indicated above. Thus the $CN\cdot$ radicals do not form cyanogen, which is only very slowly hydrolysed, but are themselves directly and rapidly hydrolysed to form bicarbonate and ammonia.

It will be appreciated that the precipitation of the green nickel cyanide indicates an end-point of the electrolytic oxidation reaction. Separation of the precipitate so produced enables the nickel to be recovered for further use. Whereas nickel cyanide is ordinarily a difficult precipitate to handle, it has been found that when produced in the process of the present invention it readily settles in the bath and recovery is achieved readily and without difficulty.

The process of the present invention is remarkably effective and will destroy very high cyanide concentrations, e.g. from 2 molar down to the order of less than 1 ppm. It makes no special demands as to cell design and relatively simple design of cell for either batch or continuous processes may be used. The process may be carried out in plate cells, fluidised bed cells, or with rotating electrode systems. Suitable electrodes are platinum, platinised titanium, platinised tantalum, or carbon electrodes. Carbon electrodes are particularly advantageous in that they show a great augmentation of mass transfer by specific adsorption. Separation of anode and cathode need only be the minimum to prevent shorting by build-up of cathodic deposits. The process operates well at room temperature. Furthermore, the catalytic effect of nickel (II) ions does not seem to be possessed by other metals, even those closely related chemically to nickel.

The improvements obtained in accordance with the present invention are not critically dependent upon nickel concentration although the desired effect increases with increasing amounts of nickel. In practice it is preferred that the nickel concentration be at least of the order of $10^{-3}$ molar.

The effect of varying the nickel concentration is shown in FIG. 1 of the accompanying drawings. The lowest curve, curve 1, shows that the current-potential relationship for 2M KCN solution using a rotated platinum disc electrode. The curve demonstrates that the rate of oxidation of $CN^-$ at the electrode is very slow, and accompanied by the oxidation of $H_2O$ at these potentials. The curve hardly varied as the rate of mass transfer was altered which indicated a slow, predominantly charge transfer controlled process.

Curves 2 to 6 show the corresponding relationships when Ni(II) is present, in increasing concentrations from $5 \times 10^{-4}M$ to $10^{-2}M$.

A very well-defined wave occurs, which has a mass transfer limited current proportional to the nickel concentration.

In studying a small scale destruction process the following experimental conditions have been employed.

A simple cell was used, consisting of a 125 $cm^2$ platinum cylindrical gauze anode, and a 40 $cm^2$ cathode. These are separated by a glass sinter as a matter of convenience; separation of anolyte from catholyte is unnecessary as the lifetime of the cyanogen radicals is extremely short. A 100 mA constant current source was employed, and the cyanide solution was stirred using a magnetic stirrer.

The cyanide concentration was determined before and after the passage of a fixed amount of charge. The method used for the determination involved titration with 0.1 M silver nitrate solution of 5 cm³ samples, made alkaline with ammonia. Potassium iodide was used to determine the end-point.

Each batch consisted of 50 cm³ of approximately 0.1 mol dm⁻³ KCN solution, to which had been added varying amounts of the nickel complex. After removal of 5 cm³ for the preliminary titration, the 45 cm³ sample remaining was electrolysed for 3600 seconds at 100 mA and a further 5 cm³ sample removed for analysis.

The results are summarised in the following Table, though many such titrations were performed. A 0.1 mol dm⁻³ cyanide blank was also run, for comparison purposes.

From the two volumes of AgNO₃ used, the amount of cyanide destroyed can be calculated. The table lists the change in cyanide concentration, and amount of cyanide for each run. The 'amount of electricity' consumed can also be written as a molar quantity by dividing the charge by the Faraday constant. Consequently an 'efficiency' can be worked out for the process, based on the assumption that one electron is involved in the oxidation of each $CN^-$.

For the cyanide blank, the efficiency is 33%, yet the presence of nickel (II) in quite low concentration ($7 \times 10^{-4}$ mol dm⁻³) is enough to increase the efficiency to 88%. For $10^{-2}$ mol dm⁻³ Ni(II) the efficiency jumps to 99%.

For a two electron process, the efficiency would be twice the reported values, and with figures like 99%, it appears that the overall process involves one electron.

FIG. 2 of the accompanying drawing shows the current/potential curves for the oxidation of 0.1 M KCN. The lowest curve relates to the absence of nickel, the upper curves being respectively those obtained in the presence of 0.0117 M and 0.198 M Ni(II), using glassy carbon disc electrodes.

TABLE

Results of Argentiometric Titrations

| Composition | | Titration Results | | $CN^-$ Concentrations | | $CN^-$ Amounts | | Cyanide Destroyed | Efficiency |
|---|---|---|---|---|---|---|---|---|---|
| $[CN^-]$ /mol | $[Ni(II)]$ dm⁻³ | $V_1$ | $V_2$ /cm³ | $c_1$ /mol | $c_2$ dm⁻³ | $m_1$ | $m_2$ /mol | $m_1 - m_2$ /mol | % |
| 0.1 | — | 2.45 | 1.78 | 0.098 | 0.071 | 0.0044 | 0.0032 | 0.0012 | 32.6 |
| 0.1 | $7.3 \times 10^{-4}$ | 2.40 | 0.55 | 0.096 | 0.022 | 0.0043 | 0.00099 | 0.0033 | 88 |
| 0.1 | $10^{-2}$ | 2.72 | 0.62 | 0.109 | 0.025 | 0.0049 | 0.0011 | 0.0038 | 99 |

Constant current used = 103 mA   Electrolysis time = 3600 s   Q = 370.8 coulombs
Q / (n.F) = $3.84 \times 10^{-3}$ mol for n = 1   Sample aliquot for titration = 5.00 cm³
AgNO₃ concentration = 0.1002 mol dm⁻³
Volume of cyanide solution for electrolysis = 45 cm³   $V_1, c_1, m_1$ before electrolysis
Electrode area = 125 cm²   $V_2, c_2, m_2$ after electrolysis

We claim:

1. In a process for the removal of cyanide from cyanide-containing solutions by electrolytic oxidation of the solution, the improvement comprising adding nickel ions to the solution to enhance the rate of oxidation.

2. The process according to claim 1, in which the concentration of nickel ions in the solution is at least 10–3 molar.

3. An electrolytic oxidation process for the removal of cyanide from a cyanide-containing solution, which comprises electrolyzing said solution between electrodes to oxidize the cyanide ions and complexes thereof and adding nickel ions to the solution to enhance the rate of said oxidation.

4. The process according to claim 3, in which the concentration of nickel ions in the solution is at least 10–3 molar.

5. The process according to claim 3, in which nickel cyanide precipitates at the end of the reaction which indicates completion of the oxidation reaction.

6. The process according to claim 3, in which platinum electrodes are used.

7. The process according to claim 3, in which carbon electrodes are used.

8. The process according to claim 3, wherein the nickel ions are added to the solution in the form of a salt soluble in said solution.

9. The process according to claim 8, in which the soluble salt is nickel sulfate.

* * * * *